United States Patent
Austin

(10) Patent No.: US 10,567,157 B2
(45) Date of Patent: Feb. 18, 2020

(54) VIRTUAL ENIGMA CIPHER

(71) Applicant: ATLASSIAN PTY LTD, Sydney (AU)

(72) Inventor: Glenn Austin, Morgan Hill, CA (US)

(73) Assignee: Atlassian Pty Ltd, Sydney (AU)

(*) Notice: Subject to any disclaimer, the term of this patent is extended or adjusted under 35 U.S.C. 154(b) by 221 days.

(21) Appl. No.: 15/885,529

(22) Filed: Jan. 31, 2018

(65) Prior Publication Data
US 2019/0238313 A1    Aug. 1, 2019

(51) Int. Cl.
*H04L 9/06* (2006.01)
*H04L 9/08* (2006.01)
*H04L 9/32* (2006.01)

(52) U.S. Cl.
CPC .......... *H04L 9/0618* (2013.01); *H04L 9/0643* (2013.01); *H04L 9/0861* (2013.01); *H04L 9/3236* (2013.01); *H04L 2209/08* (2013.01); *H04L 2209/20* (2013.01)

(58) Field of Classification Search
CPC ... H04L 9/0618; H04L 9/0643; H04L 9/0861; H04L 9/3236; H04L 2209/08; H04L 2209/20; H04L 2209/125; H04L 63/12; H04L 63/0485
See application file for complete search history.

(56) References Cited

U.S. PATENT DOCUMENTS

| | | | | |
|---|---|---|---|---|
| 6,662,223 B1 * | 12/2003 | Zhang | ................ | H04L 41/5009 709/224 |
| 8,417,943 B2 * | 4/2013 | Sydir | ................... | H04L 9/0643 713/161 |
| 2016/0196856 A1 * | 7/2016 | Tiwari | ................ | G11C 7/1012 365/189.05 |

OTHER PUBLICATIONS

Ostwald; Olaf, Modern Breaking of Enigma Ciphertexts, Mar. 2017, Version 5, all (Year: 2017).*
Rejewski;Marian,Mathematical Solution of the Enigma Cipher, Jan. 1982, Cryptologia, vol. 6, No. 1, all (Year: 1982).*

* cited by examiner

*Primary Examiner* — Alexander Lagor
*Assistant Examiner* — William B Jones
(74) *Attorney, Agent, or Firm* — Hickman Palermo Becker Bingham LLP

(57) ABSTRACT

A virtual enigma cipher system is described herein that allows for symmetric encryption and decryption of data. During encryption, a plurality of wheels representing sequences of data are used to encrypt a message. The plurality of wheels includes at least one dynamic wheel, which is generated based on a password, and a plurality of static wheels. During encryption, the unencrypted message is iterated from beginning to end. During each step of iteration, the encrypted payload value for a particular position is determined by performing an exclusive or (XOR) operation between the value of the unencrypted message at the position, and the values of the wheels at their respective wheel pointer positions. The particular position is then incremented, as are the wheel pointer positions, and iteration continues until the entire unencrypted message has been encrypted as part of the encrypted payload. Padding data and the message length are appended to the encrypted payload. During decryption, the steps are reversed.

20 Claims, 8 Drawing Sheets

VIRTUAL ENIGMA CIPHER

TECHNICAL FIELD

The present disclosure relates to cryptography. More specifically, the disclosure relates to using a modified virtual enigma cipher to perform encryption and decryption of data.

BACKGROUND

Secure encryption and decryption techniques are desirable to improve system security in the storage and transmission of sensitive data. Prior cipher techniques for encryption have numerous shortcomings that allow for malicious users to break the encryption using brute force techniques or by recognizing patterns in the encrypted data.

Enigma machines can be used to perform symmetric encryption and decryption of data. An enigma machine contains a series of rotatable wheels containing a circular sequence of characters or data. The wheels are used to map a particular set of unencrypted data to an encrypted value. In a traditional enigma machine, the configuration of the rotatable wheels is fixed. This means that the encryption techniques are prone to brute force hacking if a pattern can be detected in the encrypted data that can be used to determine the configuration of the wheels. Additionally, in an enigma machine, each rotatable wheel is rotated incrementally one at a time. Once a particular wheel has finished a complete revolution, the next wheel advances a single step, similar to an odometer. This slow incrementing of the wheels in an enigma machine limit the complexity of the encryption algorithm, thereby making the encryption more prone to brute force decryption tactics. Additionally, enigma machines can be difficult to use with streaming data, as it can difficult to determine the end of data in a streaming context. What is needed is a virtual enigma machine cipher system that cures these shortcomings, thereby improving system security and allowing the system to be used for streaming data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
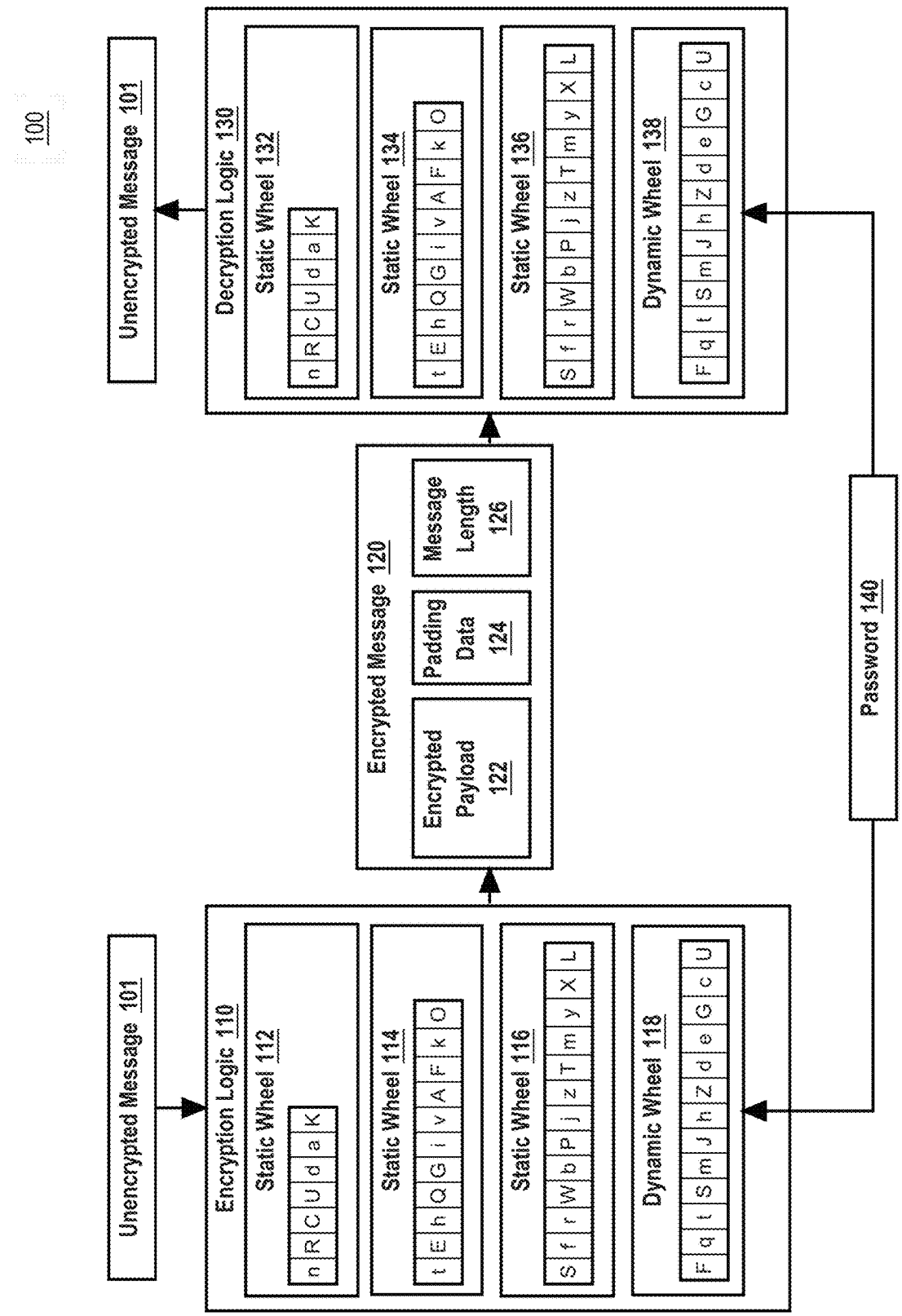
FIG. 1 is a block diagram of a virtual enigma cipher system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 STATIC WHEEL
   2.2 DYNAMIC WHEEL
   2.3 USING WHEELS TO PERFORM ENCRYPTION/DECRYPTION
   2.4 PADDING
   2.5 MESSAGE LENGTH
3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE

1.0 General Overview

A virtual enigma cipher system is described herein that allows for symmetric encryption and decryption of data. During encryption, a plurality of wheels representing sequences of data are used to encrypt a message. The plurality of wheels includes at least one dynamic wheel, which is generated based on a password, and a plurality of static wheels. The initial position of wheel pointers to each wheel is determined based on performing a modulo operation on the length of the unencrypted message and the length of the particular wheel. During encryption, the unencrypted message is iterated from beginning to end. During each step of iteration, the encrypted payload value for a particular position is determined by performing an exclusive or (XOR) operation between the value of the unencrypted message at the position, and the values of the wheels at their respective wheel pointer positions. The particular position is then incremented, as are the wheel pointer positions, and iteration continues until the entire unencrypted message has been encrypted as part of the encrypted payload. Padding data and the message length are appended to the encrypted payload. During decryption, the steps are reversed.

The present cryptography techniques provide a secure and efficient solution to providing symmetric encryption and decryption of data. By simultaneously advancing all wheels during encryption and decryption, increased variability is introduced, making it more difficult to break the cipher. Additionally, the use of multiple wheels of different sizes ensures that a single character may be encrypted as different values if the character is repeated in the message. The inclusion of padding ensures that the size of the encrypted payload in the encrypted message cannot be easily determined by a malicious actor or hacker trying to break the encryption. Additionally, including the message length as part of the encrypted message allows the present techniques to be used in encrypting streaming data, which often does not have a fixed length.

2.0 Example Computer System Implementation

FIG. 1 illustrates a virtual enigma cipher system 100 in which the techniques described herein may be practiced, according to some embodiments. In the example of FIG. 1, virtual enigma cipher system 100 is programmed or configured to encrypt and/or decrypt data. Virtual enigma cipher system 100 may be implemented across one or more physical or virtual computing devices, none of which is intended as a generic computer, since it is loaded with instructions in a new ordered combination as otherwise disclosed herein to implement the functions and algorithms of this disclosure. The example components of virtual enigma cipher system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Virtual enigma cipher system 100 illustrates only one of many possible arrangements of components configured to execute the programming described herein. Other arrangements may include fewer or different components, and the division of work between the components may vary depending on the arrangement.

Virtual enigma cipher system 100 is programmed or configured to encrypt and/or decrypt data. Virtual enigma cipher system 100 may include encryption logic 110, which is programmed or configured to receive unencrypted message 101 and password 140, and generate encrypted message 120. Encryption logic 110 is programmed or configured to use a plurality of static wheels 112, 114, and 116 and a dynamic wheel 118 to generate encrypted message 120. Further details regarding static wheels 112, 114, 116, and dynamic wheel 118 will be discussed herein.

Encrypted message 120 is data that includes encrypted payload 122. Encrypted payload 122 represents the encrypted version of unencrypted message 101. In an embodiment, encrypted message 120 may include padding data 124. Padding data 124 represents data used to pad the encrypted payload 122. Inclusion of padding data 124 in the encrypted message 120 helps to obfuscate the size of the encrypted payload 122 from hackers or other malicious users who may use such information to decipher the unencrypted message 101. Thus, including padding data 124 improves the security of the system. In an embodiment, encrypted message 120 may include message length 126, which is a value that indicates the length of the original unencrypted message 101. Message length 122 may be used by decryption logic 130 to decrypt the encrypted payload 122. Including message length 122 in encrypted message 120 enables the present system to be used for encrypting streaming data where it may be difficult to determine the length of the streaming data, due to the variability of size of data in streaming contexts. By including a message length 122, the decryption logic 130 may efficiently identify the encrypted payload 122 from the encrypted message 120.

Virtual enigma cipher system 100 may include decryption logic 130, which is programmed or configured to receive encrypted message 120 and password 140, and generate unencrypted message 101. Encryption logic 110 is programmed or configured to use a plurality of static wheels 132, 134, and 136 and a dynamic wheel 138 to generate encrypted message 120. The content of the plurality of static wheels 132, 134, and 136 and dynamic wheel 138 is the same as the content of static wheels 112, 114, 116, and 118 used by encryption logic 110, as the system is a symmetric system. Further details regarding static wheels 132, 134, and 136 and dynamic wheel 138 will be discussed herein.

The implementation of encryption logic 110 and decryption logic 130 may vary in different embodiments. For example, in one embodiment, encryption logic 110 may be implemented on one or more client-side computing devices and decryption logic 130 may be implemented on one or more server-side computing devices. In another embodiment, encryption logic 110 may be implemented on one or more server-side computing devices and decryption logic 130 may be implemented on one or more client-side computing devices. In another implementation, encryption logic 110 and decryption logic 130 may be partially or wholly implemented on the same one or more computing devices. For example, encryption logic 110 may be programmed or configured to generate an encrypted message 120 for local storage on one or more computing devices, and decryption logic 130 may be programmed or configured to decrypt the same locally stored encrypted message 120.

Likewise, the static wheels 112, 114, 116, 132, 134, and 136 depicted in virtual enigma cipher system 100, as well as the dynamic wheels 118 and 138 depicted in virtual enigma cipher system 100 are merely exemplary to demonstrate the configuration of the system as whole. The implementation details, order, or structure of the wheels may vary in different embodiments.

2.1 Static Wheel

Virtual enigma cipher system 100 may include a plurality of static wheels 112, 114, 116, 132, 134, and 136. A static wheel is a data structure storing a sequence of data values in a circular format. The exact implementation details of the data structure of a static wheel may vary in different embodiments. For example, a static wheel may be represented as a string of characters, an array, a linked list, a circular linked list, vector, queue, or any other data structure that can represent data values in a sequence. For example, in FIG. 1, static wheel 112 is represented as a string "nRCUdaK", static wheel 114 is represented as a string "tEhQGivAFkO", and static wheel 116 is represented as a string "SfrWbPizTmyXL". The exact details and contents of a static wheel may vary from embodiment to embodiment.

A static wheel organizes data in a circular format because each data value of the sequence of data values is understood to be linked to its predecessor and successor data values and because the last data value in the sequence of data values is linked to the first data value in the sequence of data values, thus completing a circular pattern. For example, in static wheel 112, the last value "K" is linked to the first data value "n" in a circular pattern.

A static wheel is static because it is not generated based on a password. In an embodiment, the static wheels of virtual enigma cipher system may be pre-stored and fixed. In another embodiment, the static wheels of virtual enigma cipher system may be generated and determined by encryption logic 110 and decryption logic 130 based on some other criteria separate from a password, such as a timestamp value.

Encryption logic 110 and decryption logic 130 have access to an identical set of static wheels to ensure that decryption logic 130 is able to properly decrypt messages that are encrypted by encryption logic 110. For example, in virtual enigma cipher system 100, static wheel 112 corresponds to static wheel 132, static wheel 114 corresponds to static wheel 134, and static wheel 116 corresponds to static wheel 136. Although encryption logic 110 and 130 are depicted in the example of virtual cipher system 100 as each including three static wheels, the number of static wheels may vary in different embodiments. Increasing the number of static wheels increases the variability of the encryption, thereby improving security of the encryption.

The length of a wheel is the number of data values in the sequence of data values for that wheel. Each static wheel has a length of data values that corresponds to a prime number. Additionally, the length of each static wheel in either encryption logic 110 or decryption logic 130 is unique. For example, static wheel 112 is a length of 7, static wheel 114 is a length of 11, and static wheel 116 has a length of 13, however, different prime numbers may be used in different embodiments. Using unique prime numbers for the configuration of the length of the plurality of static wheels in encryption logic 110 and decryption logic 130 prevents discernible patterns from appearing in the encrypted payload generated by the encryption logic 110 and decrypted by decryption logic 130, thereby improving system security.

2.2 Dynamic Wheel

Virtual enigma cipher system 100 may include one or more dynamic wheels 118 and 138. A dynamic wheel is a data structure storing a sequence of data values in a circular format. The exact implementation details of the data structure of a dynamic wheel may vary in different embodiments. For example, a dynamic wheel may be represented as a string of characters, an array, a linked list, a circular linked list, vector, queue, or any other data structure that can represent data values in a sequence. For example, in FIG. 1, dynamic wheel 118 is represented as a string "FqtSmJhZdeGcU". The exact details and contents of a dynamic wheel may vary from embodiment to embodiment.

Similar to a static wheel, a dynamic wheel organizes data in a circular format because each data value of the sequence of data values is understood to be linked to its predecessor and successor data values and because the last data value in the sequence of data values is linked to the first data value in the sequence of data values, thus completing a circular pattern. For example, in dynamic wheel 118, the last value "U" is linked to the first data value "F in a circular pattern.

A dynamic wheel is different than a static wheel because the contents of the dynamic wheel are dynamically generated based on a received password 140. A password 140 is text that may be received by encryption logic 110 and decryption logic 130. In an embodiment, password 140 may be manually entered by a user accessing encryption logic 110 and/or decryption logic 130. Encryption logic 110 and decryption logic 130 are each programmed and configured to generate dynamic wheels 118 and 138 based on a provided password 140. For example, in one embodiment, encryption logic 110 and decryption logic 130 may generate dynamic wheels 118 and 138, respectively, using the same hash algorithm. For example, a SHA-256 hash algorithm may be applied to the password 140 to generate a cryptographic hash value. The cryptographic hash value may then be used as the sequence of data values for dynamic wheels 118 and 138. In other embodiments, different hash algorithms may be used for generating dynamic wheels. The use of a password to generate a dynamic wheel improves the security of the system, because the encryption and decryption of the message relies on using a cipher that is generated, at least in part, based on the password itself, rather than only using a static set of wheels. By varying the password, the encryption and decryption of the system can be quickly and efficiently changed, thereby making it difficult for a user to decrypt messages without the password.

Encryption logic 110 and decryption logic 130 have access to an identical set of dynamic wheels to ensure that decryption logic 130 is able to properly decrypt messages that are encrypted by encryption logic 110. For example, in virtual enigma cipher system 100, dynamic wheel 118 corresponds to dynamic wheel 138. Although encryption logic 110 and 130 are depicted in the example of virtual cipher system 100 as each including a single dynamic wheel, the number of dynamic wheels may vary in different embodiments. Increasing the number of dynamic wheels increases the variability of the encryption, thereby improving security of the encryption.

In an embodiment, the length of a dynamic wheel may correspond to a prime number, however, in other embodiments, the length of a dynamic wheel may not correspond to a prime number.

2.3 Using Wheels to Perform Encryption/Decryption

Figure 2A:
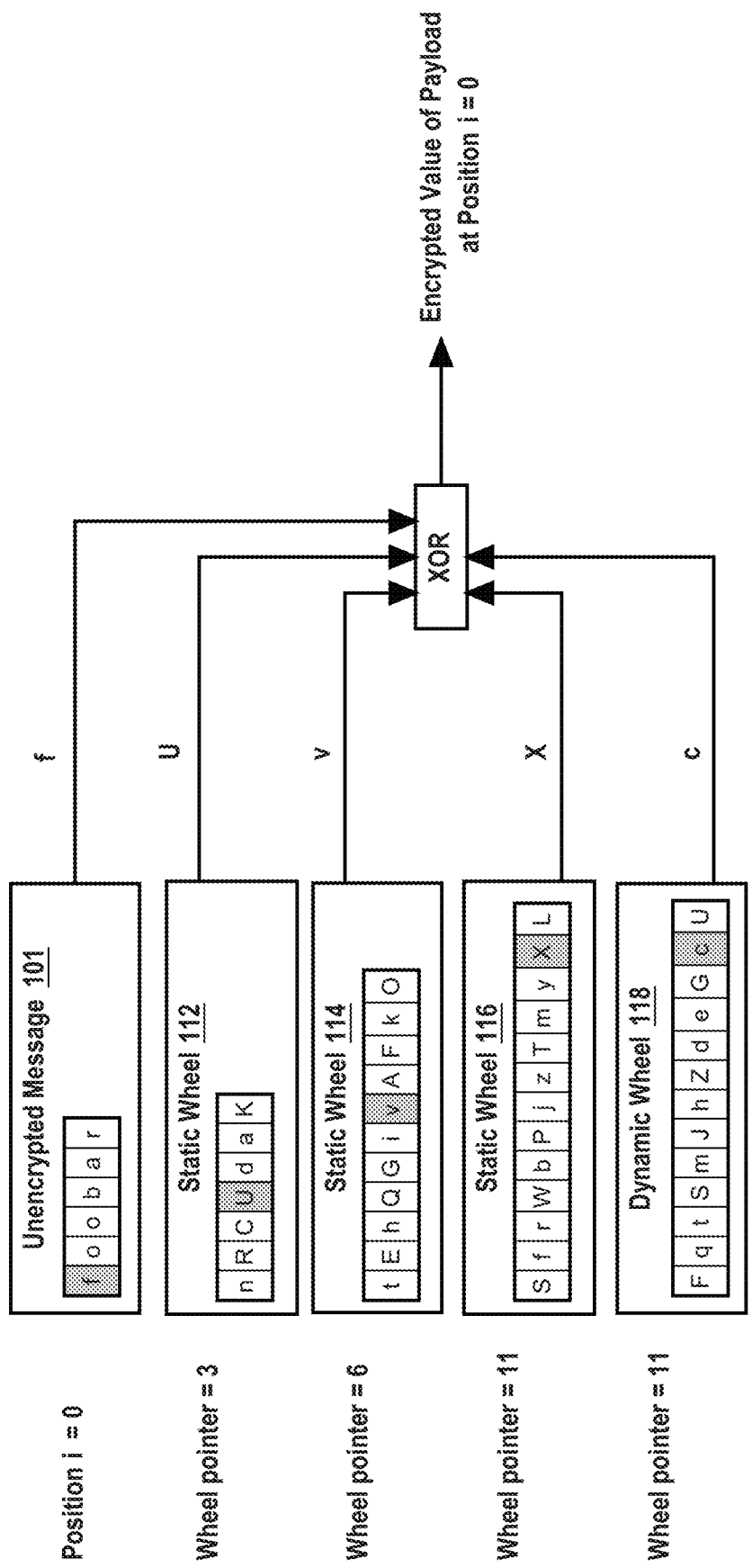
FIGS. 2A, 2B, and 2C illustrate example steps of iterating through the encryption of a message.
Figure 2B:
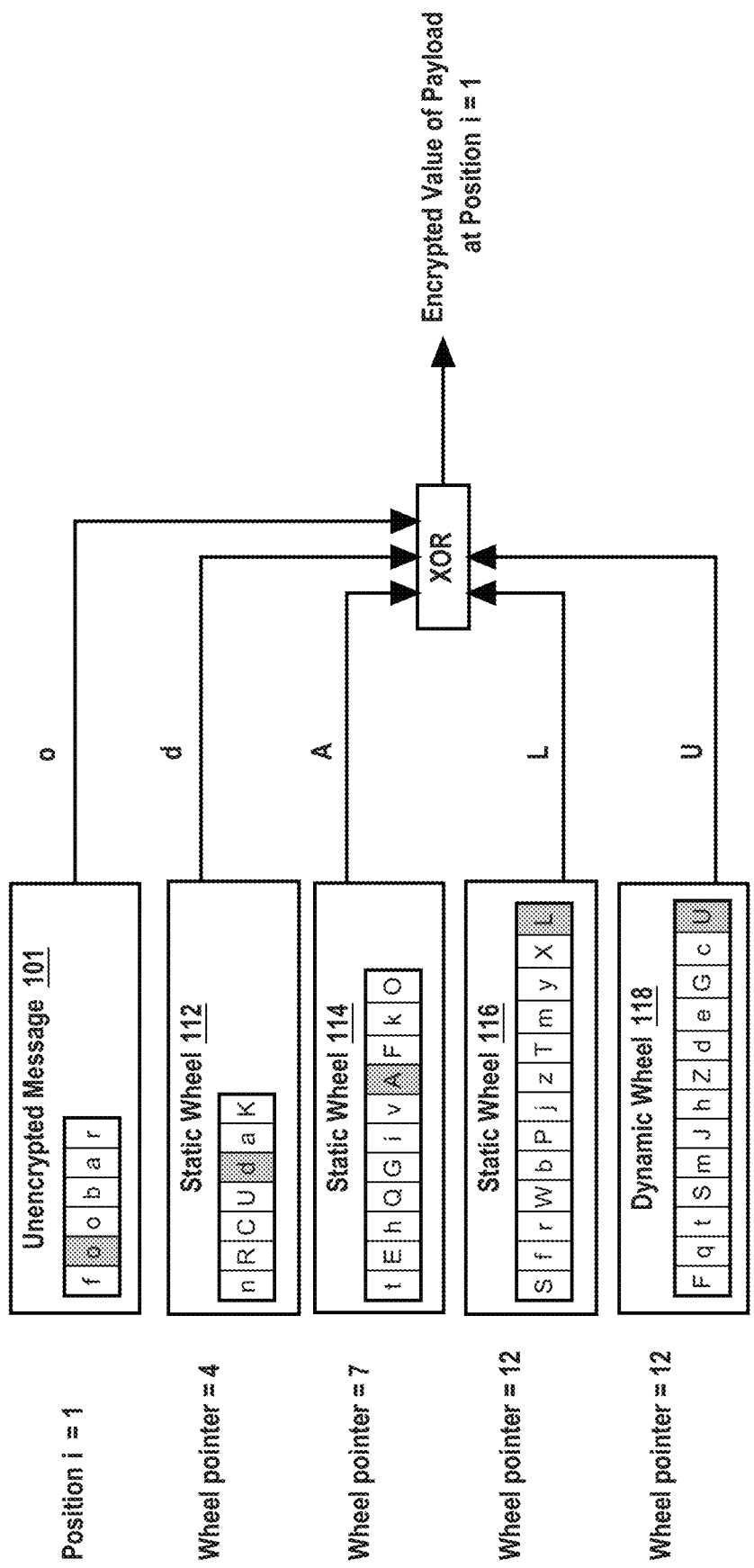
Figure 2C:
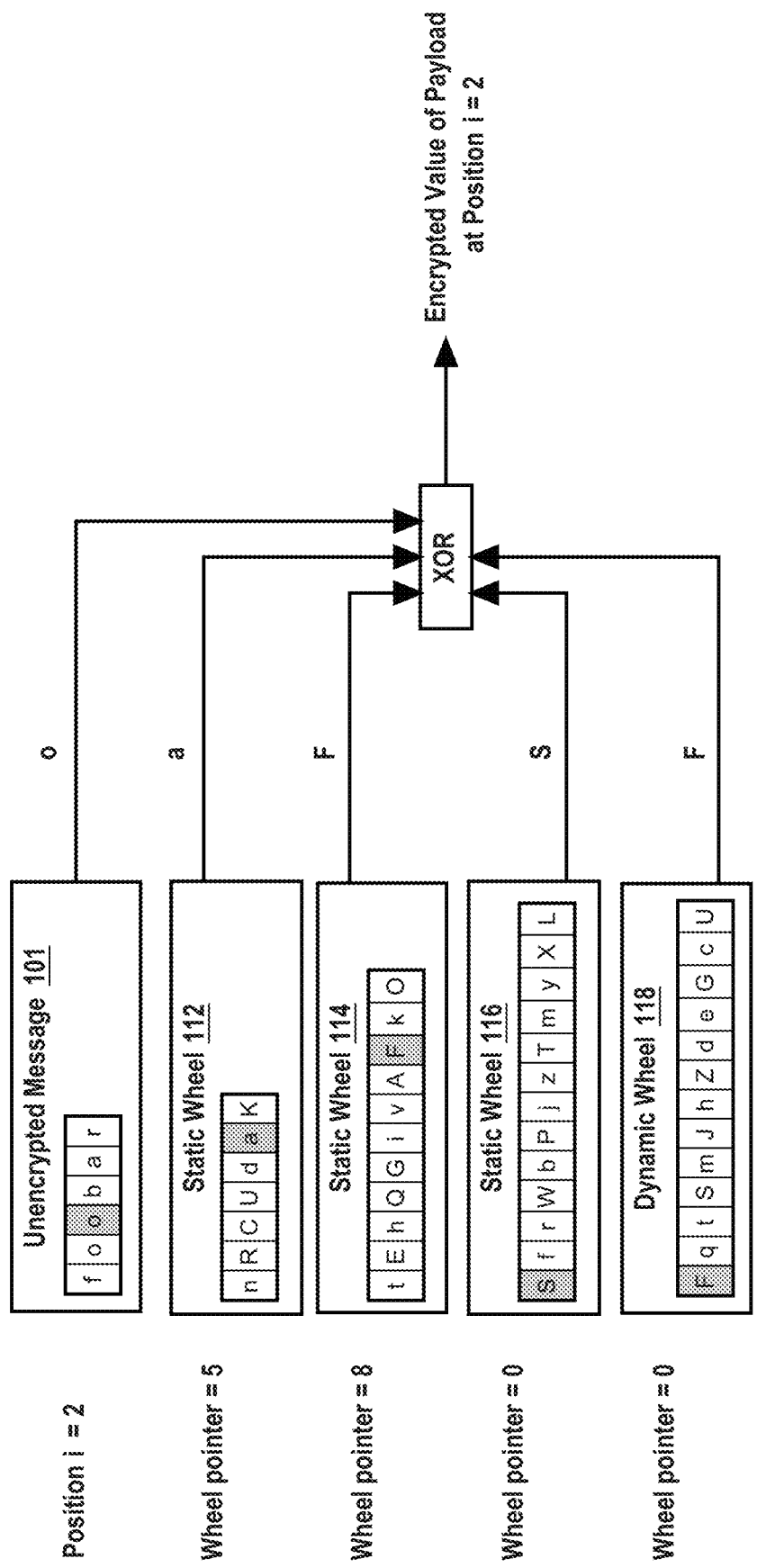

Encryption logic 110 is programmed and configured to use a plurality of static wheels and one or more dynamic wheels to generate an encrypted payload 122 from an unencrypted message 101. FIGS. 2A, 2B, and 2C illustrates how the wheels may be used to generate an encrypted payload for an example unencrypted message 101 comprising the string "foobar".

First, encryption logic 110 determines the length of the unencrypted message 101. Encryption logic 110 may maintain a plurality of pointers to each wheel, including both static and dynamic wheel(s), that points to the current value of that particular wheel. In an embodiment, the length of the unencrypted message 101 may be used to determine the initial positions of the pointers of each wheel to use during the encryption process. For example, encryption logic 110 may perform a modulo operation to determine the initial position of the pointers of each wheel as follows: Initial Pointer Position=Length of Unencrypted Message % Wheel Length. Each wheel pointer may be initialized to a different initial pointer position, as the lengths of each wheel may be varied. In a different embodiment, the wheel pointers may be initialized to initial pointer positions based on pre-stored configuration settings for each wheel.

In FIG. 2A, the initial values of the wheel pointers may be as follows: the wheel pointer $i_{w1}$ for static wheel 112 is position 3, the wheel pointer $i_{w2}$ for static wheel 114 is position 6, the wheel pointer $i_{w3}$ for static wheel 116 is position 11, and the wheel pointer $i_{w4}$ for dynamic wheel 118 is position 11. For purposes of this example, these initial wheel pointers were identified through some pre-stored configuration setting. Encrypting the $0^{th}$ position of the unencrypted message 101 is done by performing an exclusive or (XOR) operation on the value of the unencrypted message 101 at the position i=0 with the corresponding values of the wheels at their respective wheel pointers. For example, as shown in FIG. 2A, the value "f" from the unencrypted message 101 is included in a XOR operation with "U" from static wheel 112, "v" from static wheel 114, "X" from static wheel 116, and "c" from dynamic wheel 118. The resulting value of the XOR operation is output as the value of the encrypted payload at the position i=0.

To continue encryption of the unencrypted message 101, the position i is incremented by 1 to the next position in the unencrypted message 101. Likewise, each respective wheel pointer for the wheels is incremented as well. For example, in FIG. 2B, we see an example where position i in the unencrypted message 101 has been incremented by 1, as have the respective wheel pointer positions $i_{wx}$ of each wheel. The value "o" from the unencrypted message 101 is included in a XOR operation with "d" from static wheel 112, "A" from static wheel 114, "L" from static wheel 116, and "U" from dynamic wheel 118. The resulting value of the XOR operation is the value of the encrypted payload at the position i=1. The process may then be continued for the entire length of the unencrypted message 101, incrementing after each position.

If the incremented wheel pointer exceeds the length of the wheel, then the wheel pointer is wrapped around to the starting value of the wheel. This may be done by performing a modulo operation using the incremented wheel pointer position $i_{wx}$ and the length of the wheel: $i_{wx}=(i_{wx}+1)$ % Wheel Length. This will ensure that incremented wheel pointer positions will always be within the length of the wheel. For example, in FIG. 2C, the wheel pointer positions for 116 and 118 have wrapped to the starting values of the wheels at wheel pointer positions zero. Thus, the value "o" from the unencrypted message 101 is included in a XOR operation with "a" from static wheel 112, "F" from static wheel 114, "S" from static wheel 116, and "F" from dynamic wheel 118. The resulting value of the XOR operation is the value of the encrypted payload at the position i=2. This process of encryption will continue for each position i across the entire length of the unencrypted message 101 until a full encrypted payload has been generated.

By incrementing all wheels simultaneously, the system ensures that the repeat characters in the unencrypted message 101 are encrypted differently, thereby preventing a malicious user from identifying a pattern in the encrypted message. For example, FIGS. 2B and 2C both show examples of encryption of an "o" character in the unencrypted message 101. However, in both examples, the "o" character is XORed with different values from the various wheels, thereby resulting in a different final encrypted value for that character. Additionally, simultaneous advancement of each wheel increases the variability of the encryption. This variability improves the security of the system and prevents brute force attacks on the system.

Once the encrypted payload 124 is generated, padding data 124 and message length 126 are appended to the encrypted payload 122 to generate the encrypted message 120. The message length 126 represents the length of the unencrypted message 101. The padding data 124 and message length 126 may be appended at the beginning, the end, or some other position in the encrypted message 120. Further details regarding padding data 124 and message length 126 will be described herein.

Decryption of an encrypted message 120 by decryption logic 130 uses the same techniques as encryption in reverse. Decryption logic 110 is programmed and configured to use a plurality of static wheels and one or more dynamic wheels to generate an unencrypted message 101 from an encrypted message 120.

First, decryption logic 130 determines the length of the unencrypted message 101. This may be done by parsing the message length 126 from the encrypted message 120 itself.

Decryption logic 130 may maintain a plurality of pointers to each wheel, including both static and dynamic wheel(s), that points to the current value of that particular wheel. The initial pointer positions of the wheel pointers in decryption logic 130 must be the same as the initial pointer positions of the wheel pointers in encryption logic 110 at the time of encryption in order to perform accurate decryption. In an embodiment, the length of the unencrypted message 101 may be used to determine the initial positions of the pointers of each wheel to use during the decryption process. For example, decryption logic 130 may perform a modulo operation to determine the initial position of the pointers of each wheel as follows: Initial Pointer Position=Length of Unencrypted Message % Wheel Length. Each wheel pointer may be initialized to a different initial pointer position, as the lengths of each wheel may be varied. In another embodiment, the initial position of the pointers may be determined based on a pre-stored configuration setting.

Decrypting the $0^{th}$ position of the encrypted payload 122 is done by performing an exclusive or (XOR) operation on the value of the encrypted payload 122 at the position i=0 with the corresponding values of the wheels at their respective wheel pointers. The resulting value of the XOR operation is the value of the unencrypted message 101 at the position i=0. This is because XORing the same value twice restores the original value, since XORing has the following properties: if (A XOR B)=C then (C XOR B)=A.

To continue decryption of the encrypted payload 122, the position i is incremented by 1 to the next position in the encrypted payload 122. Likewise, each respective wheel pointer for the wheels is incremented as well. The resulting value of the XOR operation is the value of the unencrypted messages 101 at the position i=1. The process may then be continued for the entire length of the unencrypted message 101, incrementing after each position.

If the incremented wheel pointer exceeds the length of the wheel, then the wheel pointer is wrapped around to the starting value of the wheel. This may be done by performing a modulo operation using the incremented wheel pointer position $i_{wx}$ and the length of the wheel: $i_{wx}=(i_{wx}+1)$ % Wheel Length. This will ensure that incremented wheel pointer positions will always be within the length of the wheel. This process of decryption will continue for each position i across the entire length of the unencrypted message 101 until a full unencrypted message 101 has been generated.

2.4 Padding

Once the encrypted payload 122 is generated, padding data 124 may be appended to encrypted payload 122 by encryption logic 110. In an embodiment, padding data 124 may be appended after encrypted payload 122, and in another embodiment, padding data 124 may be appended before encrypted payload 122. Padding data 124 is included in the encrypted message 120 so that it is not apparent, from the size of the encrypted message 120, how large encrypted payload 122 is. In an embodiment, the value of padding data 124 may be generated by performing a hash function on the encrypted payload 122 itself. By using a hash function on the encrypted payload 122 to generate the padding data 124, the system ensures that the contents of the padding data 124 appear randomized and thus appear as if it were part of the encrypted payload 122, thereby improving the security the encryption. In an embodiment, the result of the hash function may be shortened or repeated, as necessary, to provide sufficient padding to satisfy a preconfigured expected size of the encrypted message 120.

In an alternative embodiment, padding data 124 may be appended to unencrypted message 101 before encryption is performed by encryption logic 101. In this alternative embodiment, padding data 124 will thus be encrypted as well, and will be included as part of the encrypted payload 122. By appending padding data 124 to unencrypted message 101 before encryption is performed, it is more difficult for a malicious user to determine that data is padding data, because the padding data 124 is itself encrypted, therefore, no discernible pattern can be detected that is easily identified as padding data as opposed to the encrypted payload 122.

2.5 Message Length

Encryption logic 110 is programmed or configured to append message length 126 when generating encrypted message 120. Message length 126 represents the length of the unencrypted message 101 and the encrypted payload 122. In various embodiments, message length 126 may be appended at the beginning or the end of the encrypted message 120, or at some other pre-specified position. Inclusion of message length 126 assists decryption logic 130 in decrypting the encrypted message 120. Decryption logic 130 may parse the message length 126 from the encrypted message 120 and use the message length 126 to initialize the starting wheel positions so that the starting wheel positions are the same as the starting wheel positions used by encryption logic 110 during encryption, as well as to determine how many iterative steps of decryption are necessary to decrypt encrypted payload 122 to unencrypted message 101.

In an embodiment, message length 126 is encoded in encrypted message 120 on a per-byte basis starting from the rightmost byte of the length value of the unencrypted message 101, to the least-significant zero of the length value of the unencrypted message 101. For example, if the length value of the unencrypted message 101 is 15, the length value of the unencrypted message 101 can be represented as a hexadecimal number as follows: 0x000000000000000F. In this example, the hexadecimal number can be encoded in two bytes, wherein the last leftmost byte is the least-significant zero. Thus, the length value of 15 can be encoded as a message length 126 as follows: 0x000F. In a different example, if the length value of the encrypted message 101 is 4096, the length value of the encrypted message 101 can be represented as a hexadecimal number as follows: 0x0000000000001000. In this example, the hexadecimal number can be encoded in three bytes, wherein the last leftmost byte is the least-significant zero. Thus, the length value of 4096 can be encoded as a message length 126 as follows: 0x001000. By encoding the message length 126 on a per-byte basis starting from the rightmost byte up to the least-significant zero, the message length 126 can vary in size depending on the size of the unencrypted message 101. By including the least-significant zero as the leftmost byte of the message length 126, the decryption logic 130 can detect the end of the message length 126 from encrypted message 120 by starting at the rightmost byte of message length 126 and parsing message length 126 until it reaches a byte with zero value after a non-zero byte, which would be the leftmost byte of the message length 126.

In an alternative embodiment, message length 126 may be encrypted using the same static wheels 112, 114, 116 and dynamic wheel 118 as is used by encryption logic 110 to encrypt unencrypted message 101. For example, in one embodiment, encryption of message length 126 may begin by initializing an encryption index counter for each wheel that is configured be initialized to the midpoint of each wheel. The message length 126 may then be encrypted in reverse order, by initializing a data index counter to point to the rightmost byte of the message length 126 and decrementing the data index counter while incrementing the encryption index counters for each wheel. Encryption is performed using the same process of taking a XOR operation amongst the values of the various wheels at their respective encryption index counters with the value of message length 126 at the data index counter. Encryption of the message length 126 significantly reduces the possibility of the encoded message length 126 as being recognized as a length value and reduces the ability of a malicious user to determine the actual plaintext length without the same data used to encrypt.

3.0 Example Processes and Algorithms

Figure 3:
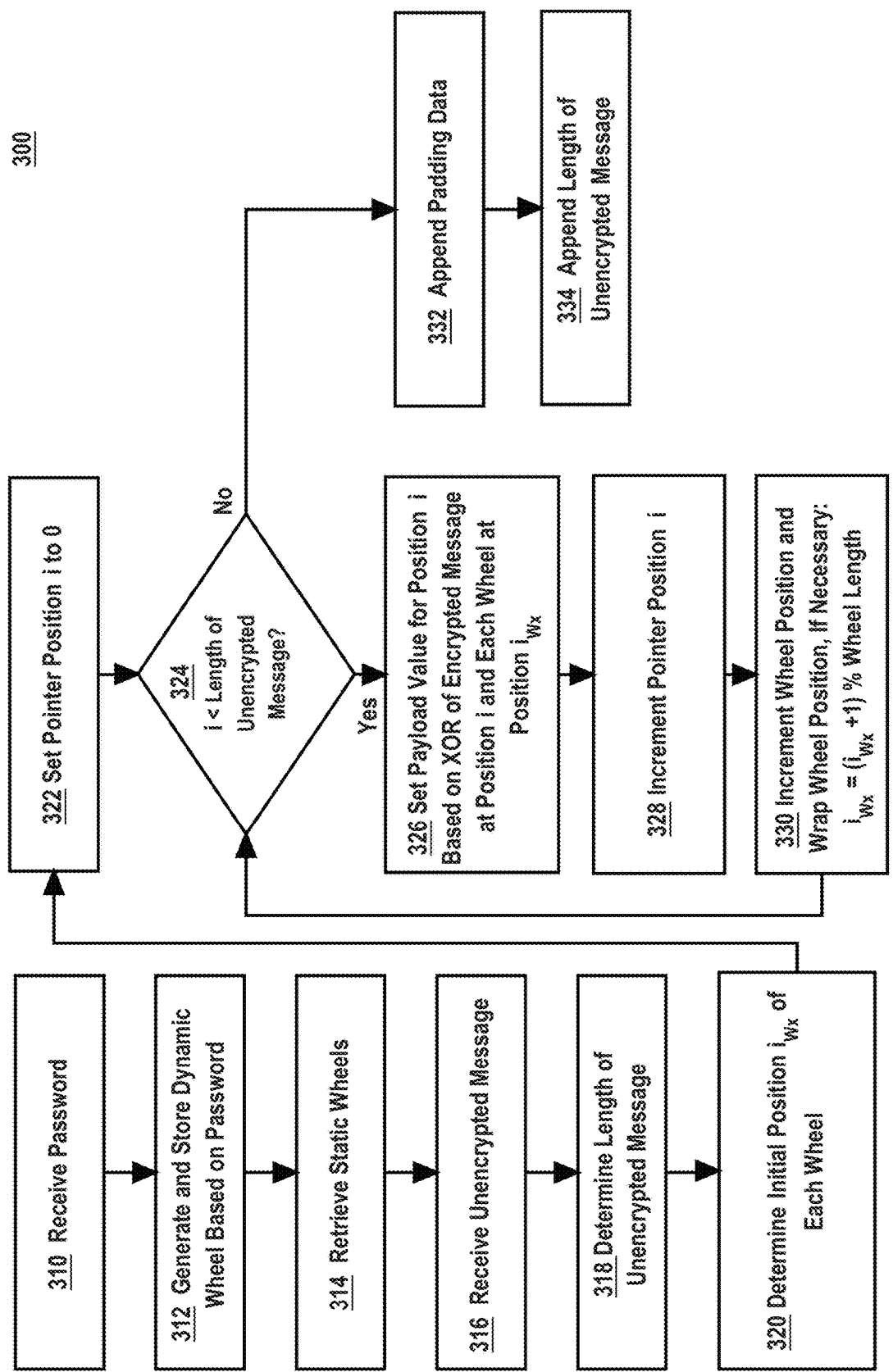
FIG. 3 illustrates a flow diagram for an encryption process using a virtual enigma cipher system, according to one embodiment.

FIG. 3 illustrates a flow diagram of an example process 300 for performing encryption of an unencrypted message using virtual enigma cipher system 100, according to one embodiment. FIG. 3 is intended to disclose an algorithm or functional description that may be used as a basis of writing computer programs to implement the functions that are described herein, and which cause a computer to operate in the new manner that is disclosed herein. Further, FIG. 3 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 300 may be performed in any order and are not limited to the order shown in FIG. 3.

The process 300 may begin at step 310. In step 310, encryption logic 110 is programmed or configured to receive a password 140. The password 140 may be, for example, a string or plain text and may be received via a user interface, or via a communication link from a separate system. The process 300 may then proceed to step 312.

In step 312, encryption logic 110 is programmed or configured to generate and store one or more dynamic wheels based on the password 140 received in step 310. A dynamic wheel is a data structure with a unique sequence of data values stored in a circular format. The generation of the dynamic wheel(s) may be done by any algorithm for generating a random and reproducible set of values. For example, in one embodiment, a hash algorithm is applied to the password 140 to generate a hash value. The hash value may be used to populate the sequence of data values of the dynamic wheel. In one embodiment, the hash algorithm that is used is a SHA-256 cryptographic hash algorithm. Once the contents of the dynamic wheel are generated by encryption logic 110, the dynamic wheel is stored. The process 300 may then proceed to step 314.

In step 314, encryption logic 110 is programmed or configured to retrieve a plurality of static wheels. Each static wheel is a data structure with a unique sequence of data values stored in a circular format. In one embodiment, the static wheels are pre-configured and do not change. In another embodiment, the static wheels are generated, in real-time, based on some additional criteria separate from the password, such as a timestamp. In an embodiment, each of the static wheels that is retrieved in this step has length that is a unique prime number. For example, in one embodiment, encryption logic 110 may retrieve three static wheels of length 7, 11, and 13, respectively. By including static wheels of different lengths of prime numbers, the system can ensure that encrypted values for the same character have different values in the encrypted payload, so as to prevent a malicious actor from deciphering the encryption. The process 300 may then proceed to step 316.

In step 316, an unencrypted message 101 is received by encryption logic 110. Unencrypted message 101 represents data that will be encrypted by encryption logic 110 and may be formatted in any way. In one embodiment, unencrypted message 101 is received simultaneously and/or from the same source as password 140. In another embodiment, unencrypted message 101 is received separately and/or from a different source as password 140. The process 300 may then proceed to step 318.

In step 318, encryption logic 110 is programmed or configured to determine the length of the unencrypted message 101. The process 300 may then proceed to step 320.

In step 320, encryption logic 110 is programmed or configured to determine the initial positions $i_{wx}$ of a plurality of wheel pointers, where each wheel point corresponds to a different wheel of encryption logic 110. The corresponding wheel may be either a static wheel or a dynamic wheel. In an embodiment, the pointer position $i_{wx}$ of a particular wheel Wax may be initialized by the following equation: Initial Pointer Position $(i_{wx})$=Length of Unencrypted Message % Wheel Length. In another embodiment, the pointer position $i_{wx}$ of a particular wheel Wx may be initialized by using a prestored configuration setting. Once the staring pointer positions for the wheels is determined, the process 300 may then proceed to step 322.

In step 322, encryption logic 110 is programmed to initialize a pointer position i=0. The pointer position i represents the position in the unencrypted message 101 during the iteration through the entire length of the unencrypted message 101 to generate the encrypted payload 122. The process 300 may then proceed to step 324.

In step 324, encryption logic 110 is programmed or configured to compare the pointer position i to the length of the unencrypted message determined in step 318. If the pointer position i is less than the length of the unencrypted message, then the process 300 will proceed to step 326 to continue encryption. If the pointer position i is not less than the length of the encrypted message, then the process 300 has concluded encryption and will proceed to step 332.

In step 326, encryption logic 110 is programmed or configured to determine the value of the encrypted payload at position i. Encryption logic 110 performs an exclusive or (XOR) operation between the value of the unencrypted message 101 at position i and the values of the static wheels and the dynamic wheels at their respective wheel pointer positions $i_{wx}$. The result value of the XOR operation is stored as the value of position i in the encrypted payload 122. The process 300 may then proceed to step 328.

In step 328, the pointer position i is incremented by one. The process 300 may then proceed to step 330.

In step 330, every wheel pointer position $i_{wx}$ is incremented by one, such that the position will wrap to the beginning of the wheel if the position, when incremented, exceeds the length of the wheel. For example, the incrementation of a wheel pointer position $i_{wx}$ for a given wheel may be determined based on the following formula: $i_{wx}$= $(i_{wx}+1)$ % Wheel Length. This is performed for every wheel being used in the encryption process. By simultaneously incrementing each wheel pointer position $i_{wx}$, the system ensures that a particular character in the unencrypted message does not necessary encrypt into the same character in the encrypted payload. The increased variability of the results of the encryption ensures that a malicious actor cannot easily determine the original unencrypted message based on patterns in the encrypted payload. The process 300 may then return to step 324.

In step 332, padding data 124 may be appended to the complete encrypted payload 122 by encryption logic 110. Padding data 124 is used to obfuscate the size of the encrypted payload 122 in the encrypted message 120. In one embodiment, padding data 124 may be determined by taking a hash value of the encrypted payload 122 itself. In one embodiment, the padding data 124 may be repeated or trimmed, as necessary to correctly fit an expected size of the encrypted message. In various embodiments, padding data 124 may be appended before or after encrypted payload 122. The process 300 may then proceed to step 334.

In step 334, encryption logic 110 is programmed or configured to append the message length 126, representing the length of the unencrypted message 101, in the encrypted message 120. In one embodiment, message length 126 may be appended to the beginning of encrypted message 120 and in another embodiment, message length 126 may be appended to the end of encrypted message 120. Message length 126 is included in encrypted message 120 so that decryption logic 130 may be able to accurately decrypt the encrypted message 120. Further, since the encryption techniques described herein may be used in streaming data contexts, the message length 126 assists the system in identifying the end of the streaming data represented by encrypted payload 122. In an embodiment, the message length 126 may be encoded on a per-byte basis starting from the rightmost byte of the message length value up to and including the least-significant zero of the message length value as the leftmost byte. The process 300 may then end.

Figure 4:
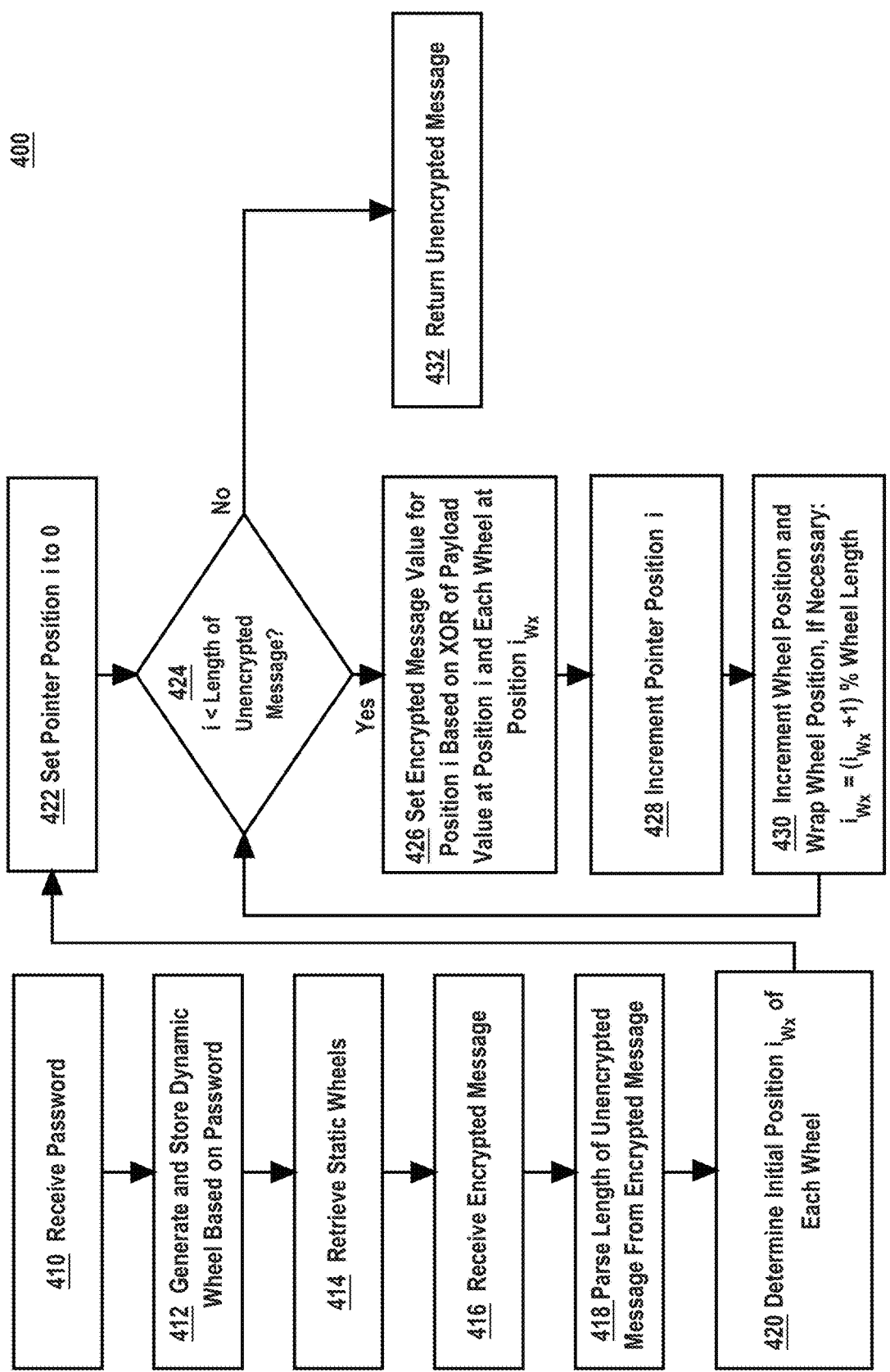
FIG. 4 illustrates a flow diagram for a decryption process using a virtual enigma cipher system, according to one embodiment.

FIG. 4 illustrates a flow diagram of an example process 400 for performing decryption of an encrypted message using virtual enigma cipher system 100, according to one embodiment. FIG. 4 is intended to disclose an algorithm or functional description that may be used as a basis of writing computer programs to implement the functions that are described herein, and which cause a computer to operate in the new manner that is disclosed herein. Further, FIG. 4 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 400 may be performed in any order and are not limited to the order shown in FIG. 4.

The process 400 may begin at step 410. In step 410, decryption logic 130 is programmed or configured to receive a password 140. The password 140 may be, for example, a string or plain text and may be received via a user interface, or via a communication link from a separate system. The process 400 may then proceed to step 412.

In step 412, decryption logic 130 is programmed or configured to generate and store one or more dynamic wheels based on the password 140 received in step 410. A dynamic wheel is a data structure with a unique sequence of data values stored in a circular format. The generation of the dynamic wheel(s) may be done by any algorithm for generating a random and reproducible set of values. The reproducible set of values ensures consistency between encryption and decryption, as the dynamic wheel(s) generated by decryption logic 130 need to be the same as the corresponding dynamic wheel(s) generated by encryption logic 110. In one embodiment, a hash algorithm is applied to the password 140 to generate a hash value. The hash value may be used to populate the sequence of data values of the dynamic wheel. In one embodiment, the hash algorithm that is used is a SHA-256 cryptographic hash algorithm. Once the contents of the dynamic wheel are generated by decryption logic 130, the dynamic wheel is stored. The process 400 may then proceed to step 414.

In step 414, decryption logic 130 is programmed or configured to retrieve a plurality of static wheels. Each static wheel is a data structure with a unique sequence of data values stored in a circular format. In one embodiment, the static wheels are pre-configured and do not change. In another embodiment, the static wheels are generated, in real-time, based on some additional criteria separate from the password, such as a timestamp. In an embodiment, each of the static wheels that is retrieved in this step has length that is a unique prime number. For example, in one embodiment, encryption logic 110 may retrieve three static wheels of length 7, 11, and 13, respectively. By including static wheels of different lengths of prime numbers, the system can ensure that encrypted values for the same character have different values in the encrypted payload, so as to prevent a malicious actor from deciphering the encryption. The static wheels retrieved in this step must be the same as the static wheels used during the encryption process. Thus, in one embodiment, both encryption logic 110 and decryption logic 130 have previously-stored the same static wheels. In another embodiment, both encryption logic 110 and decryption logic 130 are configured to generate identical static wheels based on the same criteria, thus ensuring consistency across both encryption and decryption. The process 400 may then proceed to step 416.

In step 416, an encrypted message 120 is received by decryption logic 130. Encrypted message 120 represents data that will be decrypted by decryption logic 130. In one embodiment, encrypted message 120 is received simultaneously and/or from the same source as password 140. In another embodiment, encrypted message 120 is received separately and/or from a different source as password 140. The process 400 may then proceed to step 418.

In step 418, decryption logic 130 is programmed or configured to parse the encrypted message 120 to identify and determine the message length 126. In an embodiment, the position of the message length 126 in the encrypted message 120 may be pre-determined, such as at the end of the encrypted message 120 or at the beginning of the encrypted message 120. Message length 126 represents the length of the encrypted payload 122 and thus also represents the length of the unencrypted message 101 that will be generated by decryption logic 130 during decryption. In an embodiment, the message length 126 may be parsed on a per-byte basis starting from the rightmost byte of the message length 126 field and continuing until a zero-byte field is detected to the left of a non-zero-byte field. The zero-byte field represents the least-significant zero of the message length value and is therefore determined to be the leftmost byte of the message length 126. Thus, once the zero-byte field is detected, the parsing of the message length 126 may end. The process 400 may then proceed to step 420.

In step 420, decryption logic 130 is programmed or configured to determine the initial positions $i_{wx}$ of a plurality of wheel pointers, where each wheel point corresponds to a different wheel of decryption logic 130. The corresponding wheel may be either a static wheel or a dynamic wheel. In an embodiment, the pointer position $i_{wx}$ of a particular wheel Wx may be initialized by the following equation: Initial Pointer Position ($i_{wx}$)=Length of Unencrypted Message % Wheel Length. Notably, the starting pointer positions of the various wheels will be the same result as was determined by the encryption logic 110 during encryption. In another embodiment, the initial pointer positions may be determined based on pre-stored configuration settings. Once the initial pointer positions for the wheels is determined, the process 400 may then proceed to step 422.

In step 422, decryption logic 130 is programmed to initialize a pointer position i=0. The pointer position i represents the position in the unencrypted message 101 during the iteration through the entire length of the encrypted payload 122 to generate the unencrypted message 101. The process 400 may then proceed to step 424.

In step 424, decryption logic 130 is programmed or configured to compare the pointer position i to the length of the unencrypted message 101 determined in step 418. If the pointer position i is less than the length of the unencrypted message, then the process 400 will proceed to step 426 to continue decryption. If the pointer position i is not less than the length of the encrypted message, then the process 400 will proceed to step 432.

In step 426, decryption logic 130 is programmed or configured to determine the value of the unencrypted message 101 at position i. Encryption logic 110 performs an exclusive or (XOR) operation between the value of the encrypted payload 122 at position i and the values of the static wheels and the dynamic wheels at their respective wheel pointer positions $i_{wx}$. The result value of the XOR operation is stored as the value of position i in the unencrypted message 101. The process 400 may then proceed to step 428.

In step 428, the pointer position i is incremented by one. The process 400 may then proceed to step 430.

In step 430, every wheel pointer position $i_{wx}$ is incremented by one, such that the position will wrap to the beginning of the wheel if the position, when incremented, exceeds the length of the wheel. For example, the incrementation of a wheel pointer position $i_{wx}$ for a given wheel may be determined based on the following formula: $i_{wx}=(i_{wx}+1)$ % Wheel Length. This is performed for every wheel being used in the decryption process. The process 400 may then return to step 424.

In step 432, decryption logic 130 is programmed or configured to return the unencrypted message 101 as the result of the decryption of encrypted message 120. The process 400 may then end.

4.0 Implementation Mechanisms—Hardware Overview

Figure 5:
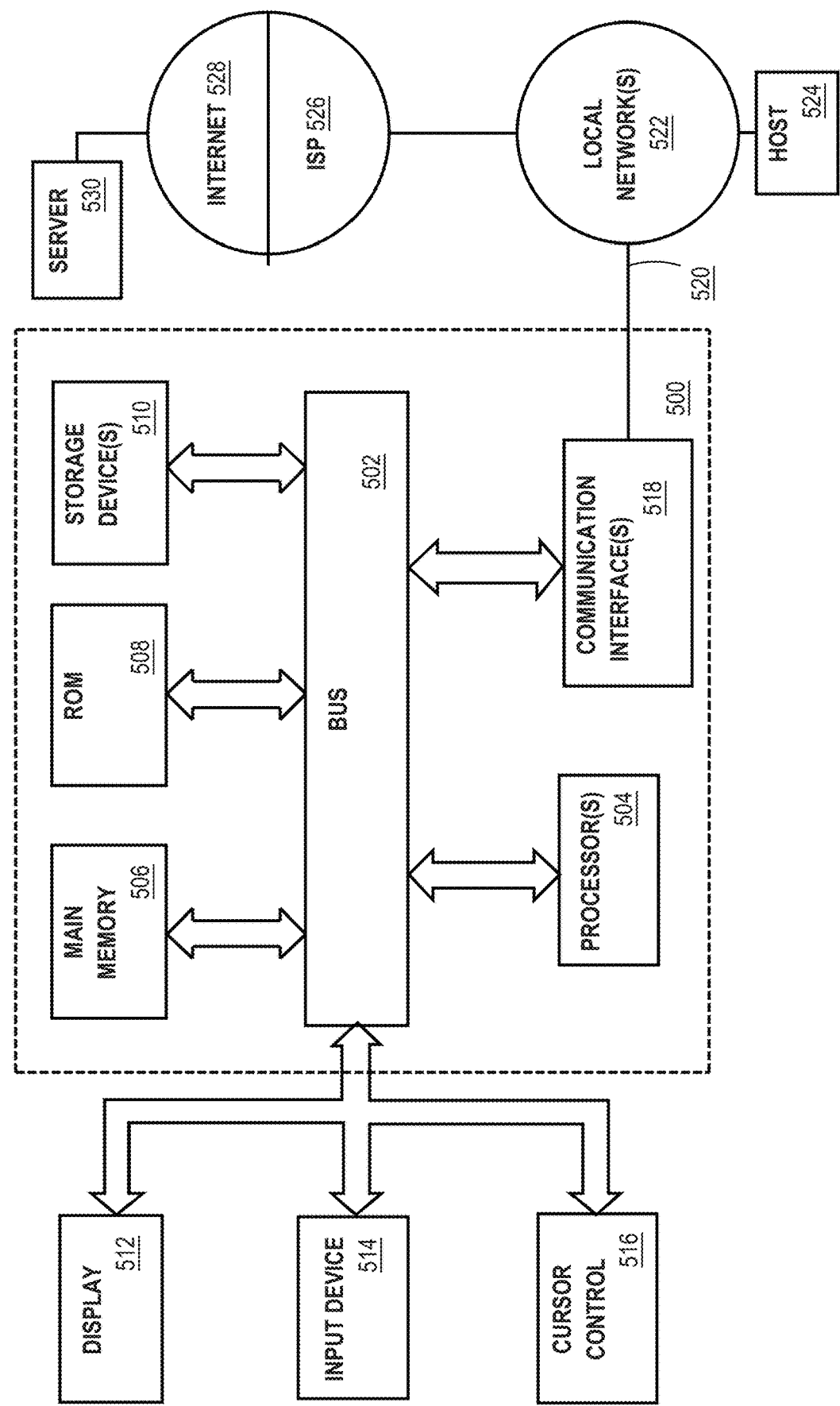
FIG. 5 is a block diagram of a computing device in which the example embodiment(s) of the present invention may be embodied.

Referring now to FIG. 5, it is a block diagram that illustrates a computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general-purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528.

Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

5.0 Implementation Mechanisms—Software Overview

Figure 6:
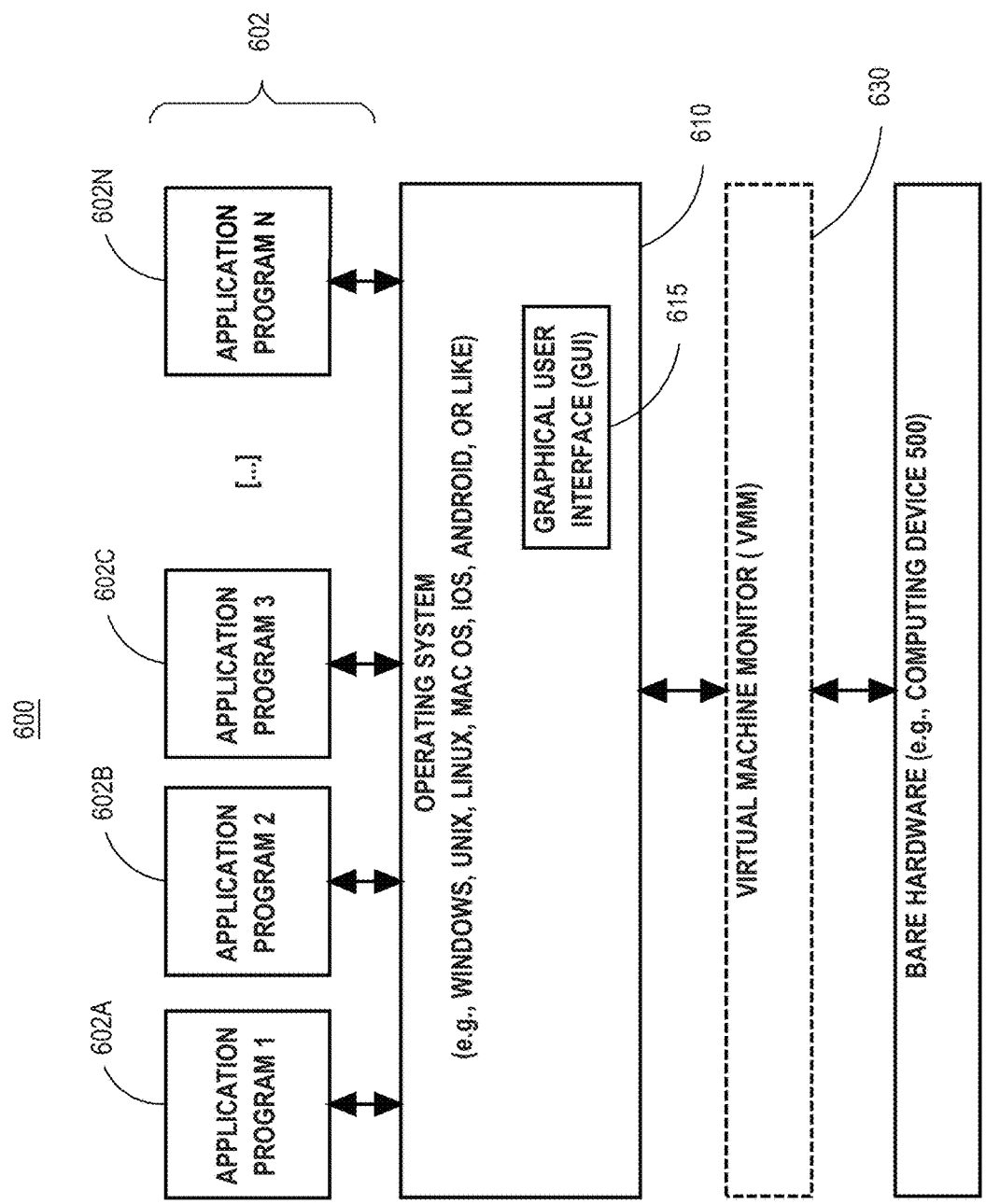
FIG. 6 is a block diagram of a software system for controlling the operation of the computing device.

FIG. 6 is a block diagram of a software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
retrieving a plurality of static wheels, wherein each static wheel of the plurality of static wheels comprises a data structure storing a sequence of data values;
receiving a password;
using the password to generate a dynamic wheel, wherein the dynamic wheel comprises a data structure storing a sequence of data values;
receiving an unencrypted message;
determining a length of the unencrypted message;

initializing a plurality of wheel pointers wherein each wheel pointer corresponds to a particular static wheel of the plurality of static wheels or the dynamic wheel;

for each particular position of the length of the unencrypted message:
  performing a XOR operation between the value of the particular position of the unencrypted message with the data values of the plurality of static wheels and the data value of the dynamic wheel at their corresponding wheel pointers to generate an encrypted result value for the particular position of the unencrypted message;
  storing the encrypted result value of the XOR operation as the value of the particular position in an encrypted payload; and
  incrementing each wheel pointer of the plurality of wheel pointers;

generating an encrypted message comprising the encrypted payload, padding data, and the length of the unencrypted message;

wherein the method is performed using one or more processors.

2. The method of claim 1, wherein each static wheel of the plurality of static wheels comprises a length that is a prime number, and wherein the length of each static wheel of the plurality of static wheels is unique.

3. The method of claim 1, wherein using the password to generate a dynamic wheel comprises:
  generating a hash value of the password;
  using the hash value of the password to generate the sequence of data values of the dynamic wheel.

4. The method of claim 3, wherein generating the hash value of the password comprises using a SHA-256 hash algorithm.

5. The method of claim 1, further comprising:
  generating the padding data by taking a hash value of the encrypted payload.

6. The method of claim 1, wherein incrementing each wheel pointer of the plurality of wheel pointers comprises:
  adding a fixed value to each wheel pointer;
  updating each wheel pointer by performing a modulo operation between the wheel pointer and the length of the corresponding wheel for the wheel pointer.

7. The method of claim 1, wherein initializing the plurality of wheel pointers comprises, for each particular wheel, performing a modulo operation between the length of the unencrypted message and a length of the particular wheel.

8. One or more non-transitory computer-readable storage media storing instructions, which when executed by one or more processors, cause:
  retrieving a plurality of static wheels, wherein each static wheel of the plurality of static wheels comprises a data structure storing a sequence of data values;
  receiving a password;
  using the password to generate a dynamic wheel, wherein the dynamic wheel comprises a data structure storing a sequence of data values;
  receiving an unencrypted message;
  determining a length of the unencrypted message;
  initializing a plurality of wheel pointers wherein each wheel pointer corresponds to a particular static wheel of the plurality of static wheels or the dynamic wheel;
  for each particular position of the length of the unencrypted message:
    performing a XOR operation between the value of the particular position of the unencrypted message with the data values of the plurality of static wheels and the data value of the dynamic wheel at their corresponding wheel pointers to generate an encrypted result value for the particular position of the unencrypted message;
    storing the encrypted result value of the XOR operation as the value of the particular position in an encrypted payload; and
    incrementing each wheel pointer of the plurality of wheel pointers;
  generating an encrypted message comprising the encrypted payload, padding data, and the length of the unencrypted message.

9. The one or more non-transitory computer-readable storage media of claim 8, wherein each static wheel of the plurality of static wheels comprises a length that is a prime number, and wherein the length of each static wheel of the plurality of static wheels is unique.

10. The one or more non-transitory computer-readable storage media of claim 8, wherein the instructions for using the password to generate a dynamic wheel comprise instructions for:
  generating a hash value of the password;
  using the hash value of the password to generate the sequence of data values of the dynamic wheel.

11. The one or more non-transitory computer-readable storage media of claim 10, wherein the instructions for generating the hash value of the password comprise instructions for using a SHA-256 hash algorithm.

12. The one or more non-transitory computer-readable storage media of claim 8, further comprising instructions, which when executed by the one or more processors, cause:
  generating the padding data by taking a hash value of the encrypted payload.

13. The one or more non-transitory computer-readable storage media of claim 8, wherein the instructions for incrementing each wheel pointer of the plurality of wheel pointers comprise instructions for:
  adding a fixed value to each wheel pointer;
  updating each wheel pointer by performing a modulo operation between the wheel pointer and the length of the corresponding wheel for the wheel pointer.

14. The one or more non-transitory computer-readable storage media of claim 8, wherein the instructions for initializing the plurality of wheel pointers comprise instructions for: for each particular wheel, performing a modulo operation between the length of the unencrypted message and a length of the particular wheel.

15. A method, comprising:
  retrieving a plurality of static wheels, wherein each static wheel of the plurality of static wheels comprises a data structure storing a sequence of data values;
  receiving a password;
  using the password to generate a dynamic wheel, wherein the dynamic wheel comprises a data structure storing a sequence of data values;
  receiving an encrypted message comprising an encrypted payload, padding data, and a length of an unencrypted message;
  parsing length of the unencrypted message from the encrypted message;
  initializing a plurality of wheel pointers wherein each wheel pointer corresponds to a particular static wheel of the plurality of static wheels or the dynamic wheel;
  for each particular position of the length of the unencrypted message:
    performing a XOR operation between the value of the particular position of the encrypted payload with the data values of the plurality of static wheels and the data value of the dynamic wheel at their corresponding wheel pointers to unencrypted message result value for the particular position of the unencrypted message;

storing the unencrypted message result value of the XOR operation as the value of the particular position in the unencrypted message; and incrementing each wheel pointer of the plurality of wheel pointers;

wherein the method is performed using one or more processors.

16. The method of claim 15, wherein each static wheel of the plurality of static wheels comprises a length that is a prime number, and wherein the length of each static wheel of the plurality of static wheels is unique.

17. The method of claim 15, wherein using the password to generate a dynamic wheel comprises:

generating a hash value of the password;

using the hash value of the password to generate the sequence of data values of the dynamic wheel.

18. The method of claim 17, wherein generating the hash value of the password comprises using a SHA-256 hash algorithm.

19. The method of claim 15, wherein incrementing each wheel pointer of the plurality of wheel pointers comprises:

adding a fixed value to each wheel pointer;

updating each wheel pointer by performing a modulo operation between the wheel pointer and the length of the corresponding wheel for the wheel pointer.

20. The method of claim 15, wherein initializing the plurality of wheel pointers comprises, for each particular wheel, performing a modulo operation between the length of the unencrypted message and a length of the particular wheel.

* * * * *